United States Patent
Li et al.

(10) Patent No.: US 9,440,387 B2
(45) Date of Patent: Sep. 13, 2016

(54) NOZZLE OF INJECTION MACHINE AND HEATING APPARATUS OF THE NOZZLE

(71) Applicant: FOXNUM TECHNOLOGY CO., LTD., Taichung (TW)

(72) Inventors: Chien-Hsing Li, Taichung (TW); Cheng-Wei Weng, Taichung (TW)

(73) Assignee: FOXNUM TECHNOLOGY CO., LTD., Taichung (TW)

( * ) Notice: Subject to any disclaimer, the term of this patent is extended or adjusted under 35 U.S.C. 154(b) by 299 days.

(21) Appl. No.: 14/092,938

(22) Filed: Nov. 28, 2013

(65) Prior Publication Data

US 2014/0319126 A1    Oct. 30, 2014

(30) Foreign Application Priority Data

Apr. 29, 2013    (TW) .............................. 102115320 A

(51) Int. Cl.
| | |
|---|---|
| *B29C 45/20* | (2006.01) |
| *B29C 45/74* | (2006.01) |
| *H05B 3/06* | (2006.01) |
| *H05B 3/44* | (2006.01) |
| *H05B 3/48* | (2006.01) |
| *B29C 45/27* | (2006.01) |
| *B29C 45/17* | (2006.01) |
| *H05B 3/42* | (2006.01) |

(52) U.S. Cl.
CPC ....... *B29C 45/2737* (2013.01); *B29C 45/1782* (2013.01); *B29C 45/74* (2013.01); *H05B 3/42* (2013.01)

(58) Field of Classification Search
None
See application file for complete search history.

(56) References Cited

U.S. PATENT DOCUMENTS

| | | | | |
|---|---|---|---|---|
| 4,266,723 | A * | 5/1981 | Osuna-Diaz ................. | 239/132 |
| 5,591,367 | A * | 1/1997 | Schwarzkopf ............... | 219/535 |
| 5,798,504 | A * | 8/1998 | Schwarzkopf ............... | 219/550 |
| 5,871,786 | A * | 2/1999 | Hume et al. .................. | 425/549 |
| 6,043,466 | A * | 3/2000 | Jenko et al. .................. | 219/535 |
| 6,163,016 | A * | 12/2000 | Johnson et al. .............. | 219/424 |
| 6,302,680 | B1 * | 10/2001 | Gellert et al. ................ | 425/549 |
| 6,409,497 | B1 * | 6/2002 | Wurstlin ....................... | 425/549 |
| 6,789,745 | B1 * | 9/2004 | Babin et al. .................. | 239/135 |
| 2007/0221659 | A1 * | 9/2007 | Liebram et al. .............. | 219/535 |

* cited by examiner

*Primary Examiner* — Joseph M Pelham
(74) *Attorney, Agent, or Firm* — Zhigang Ma

(57) ABSTRACT

A heating apparatus for a nozzle of an injection machine includes a helical-spring shaped heating portion, a first sleeve, and a second sleeve. The first sleeve includes a first blocking portion and forms internal threads. The second sleeve includes a second blocking portion and forms external threads. The heating portion is received in the second sleeve. The internal threads are screwed into the external threads. The first blocking portion and the second blocking portion sandwich the heating portion.

6 Claims, 4 Drawing Sheets

NOZZLE OF INJECTION MACHINE AND HEATING APPARATUS OF THE NOZZLE

BACKGROUND

1. Technical Field

The disclosure relates to a nozzle of an injection machine.

2. Description of Related Art

In injection molding using an injection molding machine, nozzles with different lengths are needed to suit for different size injection molds. Thus, different lengths of heating apparatuses are replaced to support the nozzles, which is very inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
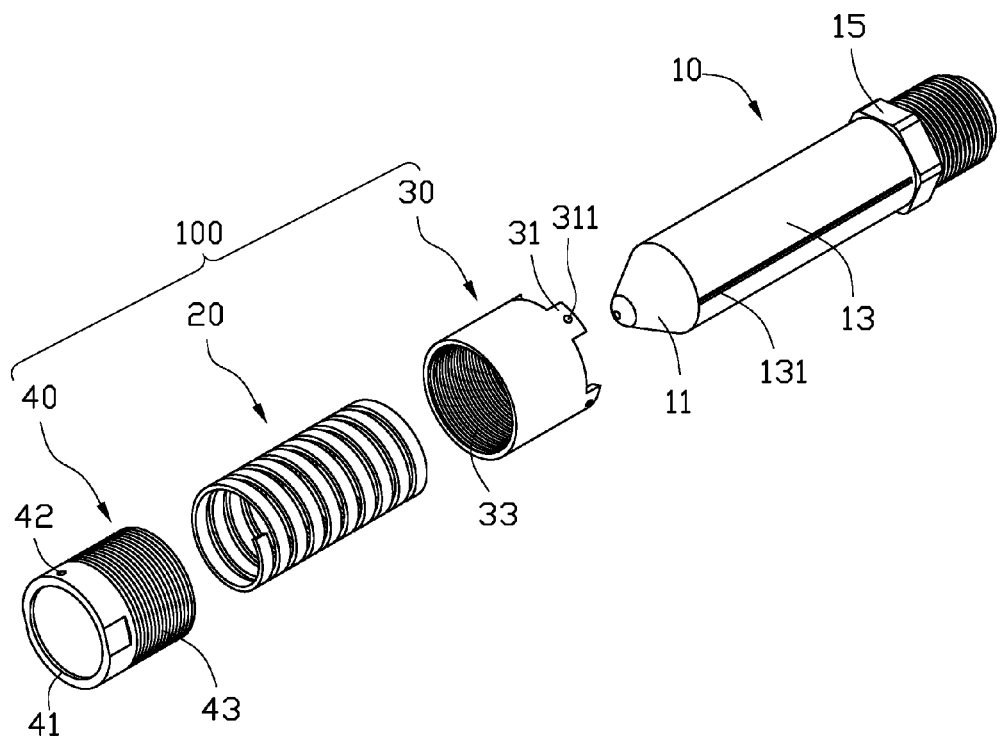
FIG. 1 is an exploded, isometric view of a nozzle of an injection machine.
Figure 2:
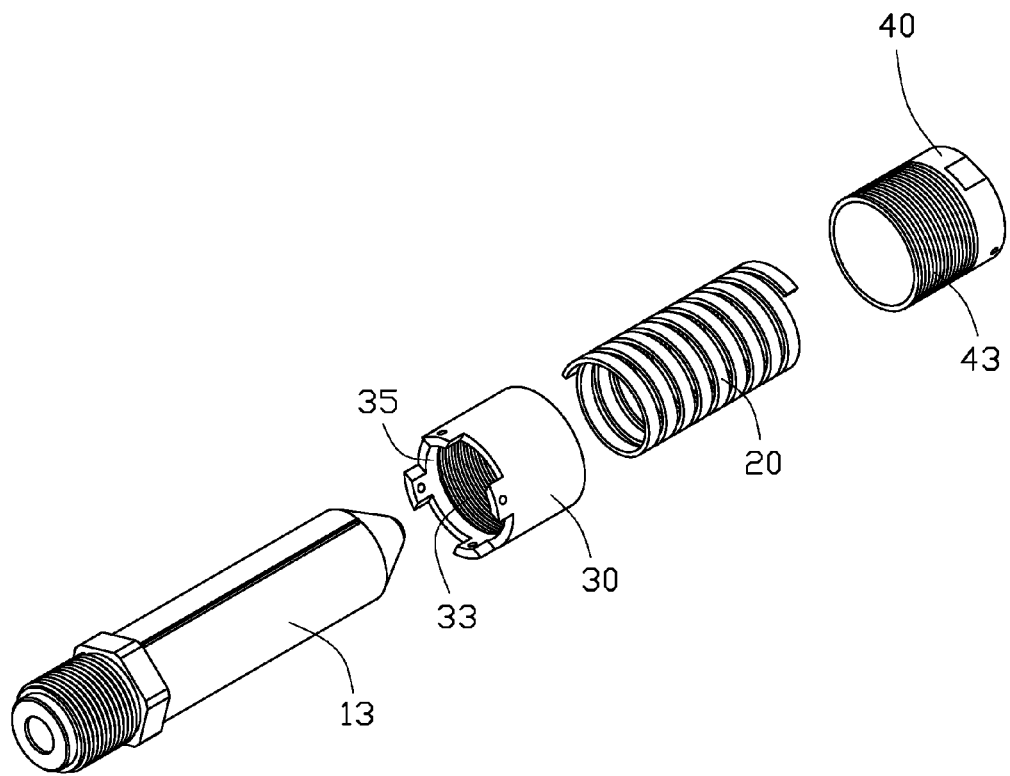
FIG. 2 is similar to FIG. 1, but viewed from another aspect.

FIG. 1 and FIG. 2 show an exemplary embodiment of a nozzle of an injection machine. The nozzle includes a main body 10 and a heating apparatus 100 set around the main body 10.

The main body 10 includes a conical nozzle head 11, a cylindrical pole 13 connected to the nozzle head 11, and a fixing portion 15 formed at one end of the pole 13 opposite to the nozzle head 11, for screwing into a discharge hole of an injection molding machine (not shown in the figures). The pole 13 defines a slot 131 in an outer surface along an axial direction of the pole 13.

The heating apparatus 100 includes a heating portion 20, a first sleeve 30, and a second sleeve 40. The heating portion 20 is a helical-spring shaped electric heating piece, which is suitable for setting around the pole 13. The heating portion 20 is compressible. A plurality of tabs 31 extend from a first end of the first sleeve 30 along an axial direction. Each tab 31 defines a first positioning hole 311. Internal threads 33 are formed on an inner surface of the first sleeve 30, adjacent to a second end opposite to the tabs 31. A ring-shaped first blocking portion 35 is formed on the inner surface of the first sleeve 30, adjacent to the first end. A ring-shaped second blocking portion 41 is formed on an inner surface of the second sleeve 40, adjacent to a first end of the second sleeve 40. A second positioning hole 42 is defined in a second end of the second sleeve 40. External threads 43, which are suitable for mating with the internal threads 33, are formed at an outer surface of the second sleeve 40, adjacent to a second end of the second sleeve 40 opposite to the second blocking portion 41.

Figure 3:
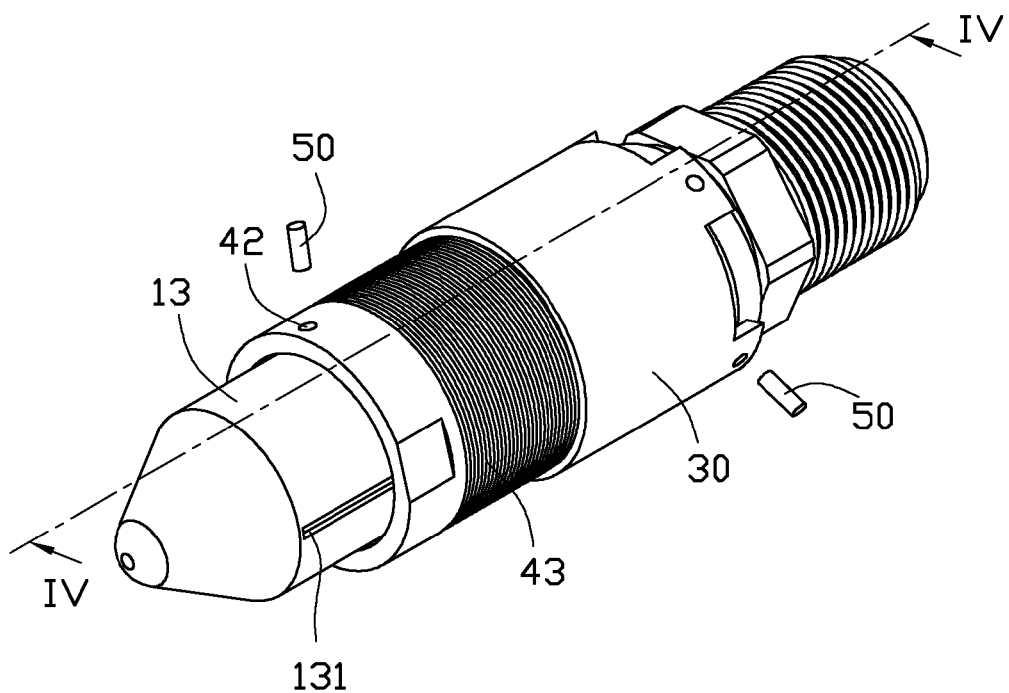
FIG. 3 is an assembled, isometric view of the nozzle of FIG. 1.
Figure 4:
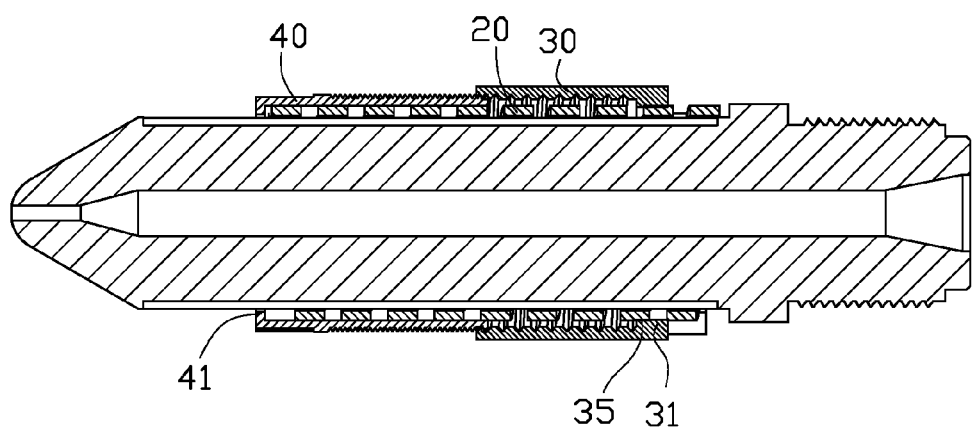
FIG. 4 is a cross-sectional view taken along the line IV-IV of FIG. 3.

FIG. 3 and FIG. 4 show that in assembling the heating apparatus 100, the heating portion 20 is received in the second sleeve 40. The first sleeve 30 is coupled to the second sleeve 40, with the external threads 43 mating with the internal threads 33. The heating portion 20 is positioned between the first blocking portion 35 and the second blocking portion 41. The heating apparatus 100 is set around the pole 13, for heating the pole 13. A pin 50 extends through the first positioning hole 311 to engage in the slot 131, for preventing the first sleeve 30 from rotating relative to the pole 13. Another pin 50 extends through the second positioning hole 411 to engage in the slot 131, for preventing the second sleeve 40 from rotating relative to the pole 13.

When fitting with another main body 10 with a shorter length, the second sleeve 40 is rotated toward the first sleeve 30. The first blocking portion 35 and the second blocking portion 41 compress the heating portion 20, to shorten the heating portion 20 and the heating apparatus 100, for suiting for the shorter main body 10.

When fitting with another main body 10 with a longer length, the second sleeve 40 is rotated away from the first sleeve 30. The first blocking portion 35 and the second blocking portion 41 release the heating portion 20 or the heating portion 20 is partly restored, to elongate the heating portion 20 and the heating apparatus 100, for suiting for the longer main body 10.

It is to be understood, however, that even though numerous characteristics and advantages of certain embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A heating apparatus, comprising:
    a helical-spring shaped heating portion;
    a first sleeve forming a first blocking portion at a first end and forming internal threads on a second end; and
    a second sleeve forming a second blocking portion at a first end and forming external threads on a second end;
    wherein the first sleeve is coupled to the second sleeve, with the external threads mating with the internal threads, the heating portion is received in the second sleeve and first sleeve, and positioned between the first blocking portion and the second blocking portion, and wherein the first sleeve comprises a plurality of tabs extending from the first end of the first sleeve along an axial direction, each tab defines a first positioning hole.

2. The heating apparatus of claim 1, wherein the second sleeve comprises a second positioning hole defined in the second end of the second sleeve.

3. The heating apparatus of claim 1, wherein the heating portion is a heating element.

4. A nozzle, comprising:
    a main body comprising a conical nozzle head and a pole connected to the nozzle head; and
    a heating apparatus setting around the pole, and comprising:
        a helical-spring shaped heating portion setting around the pole;

a first sleeve forming a first blocking portion at a first end and forming internal threads on a second end; and a second sleeve forming a second blocking portion at a first end and forming external threads on a second end;

wherein the first sleeve is coupled to the second sleeve, with the external threads mating with the internal threads, the heating portion is received in the second sleeve and positioned between the first blocking portion and the second blocking portion, and wherein the pole defines a slot in an outer surface along an axial direction of the pole, the first sleeve comprises a plurality of tabs extending from the first end of the first sleeve along an axial direction, each tab defines a first positioning hole, a pin extends through the first positioning hole to engage in the slot.

5. The nozzle of claim 4, wherein the second sleeve comprises a second positioning hole defined in the second end of the second sleeve, a pin extends through the second positioning hole to engage in the slot.

6. The nozzle of claim 4, wherein the heating portion is a heating element.

* * * * *